United States Patent
Davis et al.

(10) Patent No.: US 8,250,348 B2
(45) Date of Patent: Aug. 21, 2012

(54) METHODS AND APPARATUS FOR DYNAMICALLY SWITCHING PROCESSOR MODE

(75) Inventors: Gordon T. Davis, Chapel Hill, NC (US); Jeffrey H. Derby, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 11/132,658

(22) Filed: May 19, 2005

(65) Prior Publication Data

US 2006/0265576 A1 Nov. 23, 2006

(51) Int. Cl.
*G06F 7/38* (2006.01)
*G06F 9/00* (2006.01)
*G06F 9/44* (2006.01)
*G06F 9/46* (2006.01)

(52) U.S. Cl. .................................. 712/229; 718/108
(58) Field of Classification Search .................. 712/229; 718/108
See application file for complete search history.

(56) References Cited

U.S. PATENT DOCUMENTS

| | | | | |
|---|---|---|---|---|
| 5,638,525 A * | 6/1997 | Hammond et al. | ............ | 712/209 |
| 5,666,523 A * | 9/1997 | D'Souza | ..................... | 712/229 |
| 5,680,651 A * | 10/1997 | Tsuji et al. | ..................... | 399/401 |
| 5,778,241 A * | 7/1998 | Bindloss et al. | ................. | 712/20 |
| 5,832,299 A * | 11/1998 | Wooten | .............................. | 710/9 |
| 6,026,486 A * | 2/2000 | Kodama et al. | ................ | 712/229 |
| 6,084,554 A * | 7/2000 | Hirose et al. | ....................... | 345/5 |
| 6,092,175 A | 7/2000 | Levy et al. | | |
| 6,094,716 A | 7/2000 | Witt | | |
| 6,189,090 B1 * | 2/2001 | Tan et al. | ........................ | 712/229 |
| 6,209,020 B1 * | 3/2001 | Angle et al. | ................... | 718/108 |
| 6,263,426 B1 * | 7/2001 | Abdallah et al. | ............... | 712/229 |
| 6,269,436 B1 * | 7/2001 | Tran et al. | ......................... | 712/23 |
| 6,282,634 B1 | 8/2001 | Hinds et al. | | |
| 6,430,674 B1 * | 8/2002 | Trivedi et al. | .................... | 712/43 |
| 6,618,159 B1 * | 9/2003 | Tobita et al. | .................. | 358/1.13 |
| 6,633,800 B1 * | 10/2003 | Ward et al. | ......................... | 701/2 |
| 6,671,791 B1 * | 12/2003 | McGrath | ........................ | 711/206 |
| 6,688,125 B2 * | 2/2004 | Okamoto et al. | ............... | 62/239 |
| 6,898,697 B1 * | 5/2005 | Gao et al. | ....................... | 712/229 |
| 2003/0154366 A1 * | 8/2003 | Chow et al. | .................... | 712/229 |
| 2004/0103253 A1 * | 5/2004 | Kamei et al. | ................... | 711/143 |
| 2004/0202489 A1 * | 10/2004 | Kudou et al. | .................... | 399/66 |

OTHER PUBLICATIONS

Alan Zeichick, "WOWing Your 32-Bit Applications with 64-Bit Windows Part 1", AMD64 DevSource, Mar. 8, 2004, pp. 1-4,<www.devx.com/amd/article/20342>.

* cited by examiner

*Primary Examiner* — Eddie P Chan
*Assistant Examiner* — William Partridge
(74) *Attorney, Agent, or Firm* — Dugan & Dugan PC

(57) ABSTRACT

In a first aspect, a first processing method is provided. The first processing method includes the steps of (1) operating a processor in a first mode based on an operand size associated with a first instruction received by the processor; and (2) dynamically switching the processor operation mode from the first mode to a second mode based on a different operand size associated with a second instruction received by the processor. Numerous other aspects are provided.

7 Claims, 10 Drawing Sheets

METHODS AND APPARATUS FOR DYNAMICALLY SWITCHING PROCESSOR MODE

CROSS REFERENCE TO RELATED APPLICATION

The present application is related to U.S. patent application Ser. No. 11/132,656, filed on even date herewith and titled "METHODS AND APPARATUS FOR SHARING PROCESSOR RESOURCES", which is hereby incorporated by reference herein in its entirety.

FIELD OF THE INVENTION

The present invention relates generally to processors, and more particularly to methods and apparatus for dynamically switching processor mode.

BACKGROUND

Conventional processing systems may operate in a mode specified during configuration with an instruction set optimized to process data of a specific size (e.g., 32-bit mode or 64-bit mode). However, to change the mode of operation, conventional processing systems typically must be stopped (e.g., brought to a quiescent state). Placing a processing system in a quiescent state is inefficient as processing must be halted. Accordingly, improved methods for changing a processing system mode of operation are desired.

SUMMARY OF THE INVENTION

In a first aspect of the invention, a first processing method is provided. The first processing method includes the steps of (1) operating a processor in a first mode based on an operand size associated with a first instruction received by the processor; and (2) dynamically switching the processor operation mode from the first mode to a second mode based on a different operand size associated with a second instruction received by the processor.

In a second aspect of the invention, a first apparatus is provided. The first apparatus is a processor that includes (1) a plurality of physical registers, each of which is adapted to store at least one operand associated with an instruction or a portion of an instruction; and (2) a plurality of execution units coupled to the plurality of registers, each of the plurality of execution units is adapted to execute an instruction or a portion of an instruction. The processor is adapted to (a) operate in a first mode based on an operand size associated with a first instruction received by the processor; and (b) dynamically switch operation mode from the first mode to a second mode based on a different operand size associated with a second instruction received by the processor.

In a third aspect of the invention, a second apparatus is provided. The second apparatus is a data structure adapted to describe a memory location. The data structure includes (1) an address associated with an instruction stored in the memory location; and (2) an attribute describing an operand size associated with the instruction stored in the memory location.

In a fourth aspect of the invention, a first system is provided. The system includes (1) a memory; and (2) a processor, coupled to memory, having (a) a plurality of physical registers, each of which is adapted to store at least one operand associated with an instruction or a portion of an instruction; and (b) a plurality of execution units coupled to the plurality of registers, each of the plurality of execution units is adapted to execute an instruction or a portion of an instruction. The processor is adapted to (i) operate in a first mode based on an operand size associated with a first instruction received by the processor; and (ii) dynamically switch operation mode from the first mode to a second mode based on a different operand size associated with a second instruction received by the processor. Numerous other aspects are provided in accordance with these and other aspects of the invention.

Other features and aspects of the present invention will become more fully apparent from the following detailed description, the appended claims and the accompanying drawings.

DETAILED DESCRIPTION

Figure 1:
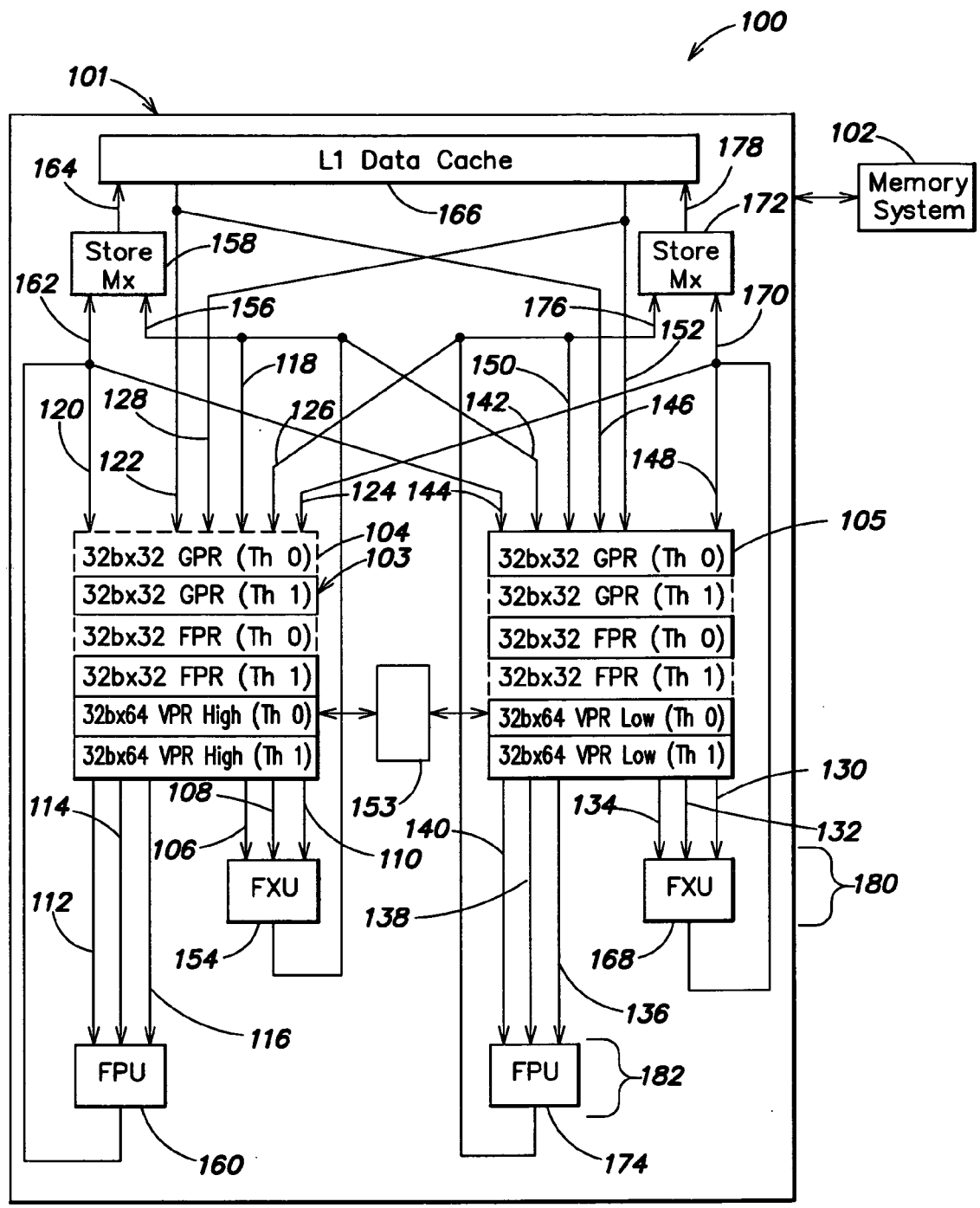
FIG. 1 is a block diagram of an exemplary processing system that can dynamically switch modes operating in a first mode in accordance with an embodiment of the present invention.

The present invention provides methods and apparatus for dynamically switching operation of a processing system from a first mode (e.g., 32-bit mode) to a second mode (e.g., 64-bit mode). More specifically, the present methods and apparatus may employ a novel structure for a page table entry and/or for a cache line tag. A page table entry data structure (e.g., page table entry) may include information describing a page (e.g., a four Kilobyte block) of memory. A tag portion along with a data portion may form a cache line, which may describe a portion of a memory page. A new memory attribute indicating a size (e.g., 32-bit or 64-bit) of data operands associated with an instruction stored in a memory page may be included in the new page table entry describing the page and/or the new tag portion of a cache line, which describes a portion of the page. In this manner, a processing system in accordance with an embodiment of the present invention may employ such memory attribute to control a mode of operation of the processing system. For example, if a memory attribute associated with a first instruction received by the processing system indicates the instruction is of a first type (e.g., associated with 32-bit operands), the processing system may operate in a first mode. For example, registers included in the processing system may store operands, respectively, associated with the instruction. Additionally or alternatively, execution units included in the processing system may independently operate on respective operands.

However, if, during operation, a memory attribute associated with a subsequent instruction received by the processing system indicates the instruction is of a second type (e.g., associated with 64-bit operands), the processing system may dynamically switch from the first mode of operation to a second mode of operation. In the second mode of operation, a plurality of registers included in the processing system may store (e.g., in tandem) an operand associated with the instruction. Additionally or alternatively, a plurality of execution units included in the processing system may operate on such operand in tandem. Although the processing system described above switches from the first mode to the second mode of operation, in some embodiments of the present invention, the processing system may switch from the second mode to the first mode of operation.

In some embodiments, the processing system may employ a unified register stack and/or allow registers in the unified register stack to store different types of data at different times as described in U.S. patent application Ser. No. 11/132,656, filed on even date herewith and titled "METHODS AND APPARATUS FOR SHARING PROCESSOR RESOURCES", which is hereby incorporated by reference herein in its entirety. In this manner, the present methods and apparatus may efficiently use registers and execution units included in a processing system, thereby reducing an overall number of such registers and/or execution units required by the processing system. Consequently, the present methods and apparatus may reduce the amount of silicon area required by the processing system and power consumed thereby. For example, the present invention may include the first and/or second exemplary processors described with reference to FIGS. 1 and 4, respectively, of U.S. patent application Ser. No. 11/132,656, filed on even date herewith and titled "METHODS AND APPARATUS FOR SHARING PROCESSOR RESOURCES", which is hereby incorporated by reference herein in its entirety.

However, the present invention may include additional and/or alternative processor designs. For example, FIG. 1 is a block diagram of an exemplary processing system that can dynamically switch modes 100 operating in a first mode in accordance with an embodiment of the present invention. With reference to FIG. 1, the exemplary processing system that can dynamically switch modes 100 may include a processor 101 coupled to a memory system 102, such as a DRAM. The processor 101 may include a first array 103 for storing a first portion of a plurality of registers 104 and a second array 105 for storing a second portion of the plurality of registers 104. Registers 104 of the first array 103 may share read and/or write ports. In some embodiments, registers 104 of the first array 103 share six read ports 106-116 and six write ports 118-128 (although a larger or smaller number of read and/or write ports may be employed). Similarly, registers 104 of the second array 105 may share read and/or write ports. In some embodiments, registers 104 of the second array 105 share six read ports 130-140 and six write ports 142-152 (although a larger or smaller number of read and/or write ports may be employed).

The first and second arrays 103-105 may be coupled to logic, such as dispatch logic 153, adapted to allocate registers as required. Further, each of the first and second arrays 103, 105 may be coupled to one or more portions of different types of execution units. Further, logic, such as arithmetic logic units (ALUs) and hardware multipliers, may be shared among the different types of execution units. For example, the first array 103 may be coupled to a first integer execution unit (FXU) 154 via some read ports (e.g., a first through third read port 106-110) shared by registers 104 of the first array 103. An output of the first FXU 154 may be coupled to a first write port 118 of the first array 103 and a first write port 142 of the second array 105. Further, the output of the first FXU 154 may be coupled to a first input 156 of a first store multiplexer 158.

Similarly, the first array 103 may be coupled to a first floating-point execution unit (FPU) 160 via some read ports (e.g., a fourth through sixth read port 112-116) shared by registers 104 of the first array 106. An output of the first FPU 160 may be coupled to a second write port 120 of the first array 103 and a second write port 144 of the second array 105. Further, the output of the first FPU 160 may be coupled to a second input 162 of the first store multiplexer 158. An output 164 of the first store multiplexer 158 may be coupled to a cache memory 166 (e.g., L1 Data cache of the processing system 100). The first store multiplexer 158 is adapted to selectively output data received by the first or second inputs 156, 162 to the cache memory 166. A first output of the cache memory 166 may be coupled to a third write port 122 of the first array 103 and a third write port 146 of the second array 105. Although not shown in FIG. 1, the processor 101 may include and/or be coupled to additional cache memory (e.g., L1 Instruction cache) and/or address translation logic (e.g., Data Effective to Real Address Translation (ERAT) logic and Instruction ERAT logic).

The second array 105 may be coupled to a second FXU 168 via some read ports (e.g., a first through third read port 130-134) shared by registers 104 of the second array 105. An output of the second FXU 168 may be coupled to a fourth write port 148 of the second array 105 and a fourth write port 124 of the first array 103. Further, the output of the second FXU 168 may be coupled to a first input 170 of a second store multiplexer 172.

Similarly, the second array 105 may be coupled to a second FPU 174 via some read ports (e.g., a fourth through sixth read port 136-140) shared by registers 104 of the second array 105. An output of the second FPU 174 may be coupled to a fifth write port 150 of the second array 105 and a fifth write port 126 of the first array 103. Further, the output of the second FPU 174 may be coupled to a second input 176 of the second store multiplexer 172. An output 178 of the second store multiplexer 172 may be coupled to the cache memory 166. The second store multiplexer 172 is adapted to selectively output data received by the first or second inputs 170, 176 to the cache memory 166. A second output of the cache memory 166 may be coupled to a sixth write port 152 of the second array 105 and a sixth write port 128 of the first array 103.

Duplicating data input to general purpose registers (GPRs) and/or floating-point registers (FPRs) of the first array 103 via write ports (e.g., the first through third write ports 118-122) to GPRs and/or FPRs of the second array 105 via write ports (e.g., the first through third write ports 142-146) and/or duplicating data input to GPRs and/or FPRs of the second array 105 via write ports (e.g., the fourth through sixth write ports 148-152) to GPRs and/or FPRs of the first array 103 via write ports (e.g., the fourth through sixth write ports 124-128) may enable more efficient use of the execution units of the processing system 100.

Further, the first and second FXUs 154, 168 of the exemplary processing system 100 may include a first vector execution unit (VMX) (e.g., a VMX for performing simple operations) coupled to some read ports (e.g., the first through third read ports 106-110) of the first array 103 and some read ports (e.g., the first through third read ports 130-134) of the second array 105. As shown the first VMX 180 may share logic with the first and/or second FXUs 154, 168. For example, the first VMX 180 may include the first and/or second FXUs 154, 168.

Additionally, the exemplary processing system 100 may include a second VMX (e.g., a VMX for performing complex operations) coupled to some read ports (e.g., the fourth through sixth read ports 112-116) of the first array 103 and some read ports (e.g., the fourth through sixth read ports 136-140) of the second array 105. As shown the second VMX 182 may share logic with the first and/or second FPUs 160, 174. For example, the second VMX 182 may include the first and/or second FPUs 160, 174.

By sharing read and/or write ports 106-116, 118-128 among registers 104 of the first array 103, and by sharing read and/or write ports 130-140, 142-152 among registers 104 of the second array 105, the processing system 100 may require a smaller number of read and/or write ports overall, thereby requiring less logic overall. Consequently, power consumed by the processing system 100 and/or silicon area required thereby may be reduced. Additionally or alternatively, by sharing logic between (or among) the different types of execution units, the processing system 100 may require less logic overall, thereby reducing power consumed by the processing system 100 and/or silicon area required thereby.

In some embodiments, each register 104 of the exemplary processing system 100 is adapted to store thirty-two bits of data (although one or more of the registers 104 may store a larger or smaller amount of data). Further, in some embodiments, each of the first and second arrays 103, 105 may include thirty-two GPRs, thirty-two FPRs, sixty-four VPRs for operating on a first thread and/or sixty-four VPRs for operating on a second thread. However, the first and/or second arrays 103, 105 may include a larger or smaller number of GPRs, FPRs, VPRs for operating on a first thread and/or VPRs for operating on a second thread. Further, each FXU and FPU 154, 160, 168, 174 may operate on thirty-two bit operands (although one or more of the FXUs and FPUs may operate on an operand of a larger or smaller size).

The exemplary processing system 100, which may dynamically switch modes, is shown operating in a first mode. The first mode may be a thirty-two bit mode in which the exemplary processing system 100 receives instructions for execution by a first thread associated with 32-bit operands. In the first mode, a 32-bit integer operand associated with an integer instruction may be stored in a GPR of the first array 103. The first FXU 154 may operate on the data operand associated with integer instruction. Similarly, in the first mode, a 32-bit floating-point operand associated with a floating-point instruction may be stored in an FPR of the first array 103. The first FPU 160 may operate on the data operand associated with the floating-point instruction.

While operating in the first mode, during the same time that registers 104 in the first array 103 are storing operands associated with instructions corresponding to (e.g., received for execution by) a first thread, and executing such instructions, data may be stored in the second array 105 in a similar manner by instructions corresponding to (e.g., received for execution by) a second thread. For example, a 32-bit integer operand associated with an integer instruction may be stored in a GPR of the second array 105. The second FXU 168 may operate on the data operand associated with integer instruction. Similarly, in the first mode, a 32-bit floating-point operand associated with a floating-point instruction may be stored in an FPR of the second array 105. The second FPU 174 may operate on the data operand associated with the floating-point instruction. In this manner, registers 104 in the first and second arrays 103, 105 may store operands associated with the instructions executed by two threads or instruction streams simultaneously.

In this manner, while operating in the first mode, a GPR in the processing system 100 may store an entire integer operand associated with an integer instruction, and an FPR in the processing system 100 may store an entire floating-point operand associated with a floating-point instruction. Further, an execution unit (e.g., FPU, FXU) included in the exemplary processing system 100 may operate on an entire operand associated with an instruction (e.g., independently). In this manner, the exemplary processing system 100 efficiently may use registers (e.g., GPRs and FPRs) 104 and/or execution units (e.g., FXUs and FPUs) while operating in the first mode.

In an alternate operational state of the processing system 100 illustrated in FIG. 1 (in phantom), one of the execution threads may be disabled, making all resources available to the remaining thread. In this mode, identical operand data may be written to both register arrays 103, 105. For example, FXU 154 may write the same data to array 103 via write port 118 and to array 105 via write port 142. FXU 168 writes the same data to array 103 via write port 124 and to array 105 via write port 148. FPU 160 writes the same data to array 103 via write port 120 and to array 105 via write port 144. FPU 174 writes the same data to array 103 via write port 126 and to array 105 via write port 150. In this manner, the active execution thread can leverage twice as many execution units (two FXUs and two FPUs), resulting in the capability to execute more instructions during each processor cycle, and thus increasing performance when only one thread is required. As shown, this capability may be extended to support multiple active threads by including GPR and FPR registers for each thread in each register array 103, 105. Note that VPR registers are already extended in this way since they require longer operands (e.g. a single operand must span both register arrays 103, 105).

Figure 2:
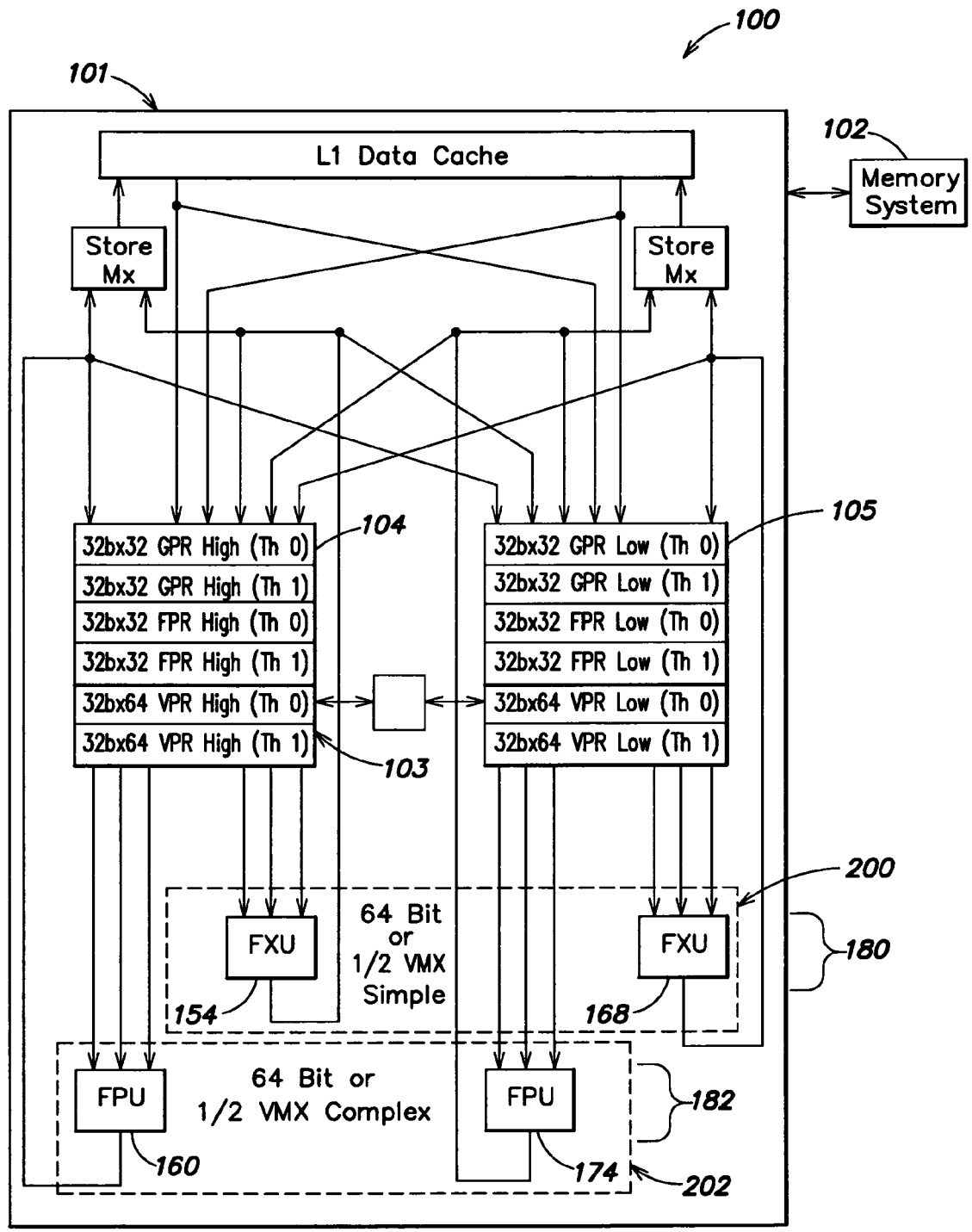
FIG. 2 is a block diagram of the exemplary processing system that can dynamically switch modes operating in a second mode in accordance with an embodiment of the present invention.

FIG. 2 is a block diagram of the exemplary processing system that can dynamically switch modes operating in the second mode in accordance with an embodiment of the present invention. With reference to FIG. 2, while operating in the second mode, registers 104 in both the first and second arrays 103, 105 may be employed to store an operand associated with an instruction requiring 64-bit operands. For example, a GPR in the first array 103 may store a first portion (e.g., most significant bits) of an integer instruction, and a GPR in the second array 105 may store a second portion (e.g., least significant bits) of the instruction. The first and second portions of the instruction may be stored in GPRs of the first and second arrays 103, 105, respectively, in tandem or simultaneously. Further, a plurality of execution units (e.g., an execution unit coupled to the first array 103 and an execution unit coupled to the second array 105) may operate on an operand associated with the instruction in tandem. As illustrated by the first dotted box 200, the first and second FXUs 154, 168 may be coupled using carry propagation. In this manner, the first and second FXUs 154, 168 may operate on an operand, portions of which are stored in GPRs in the first and second arrays 103, 105, in tandem. Therefore, for embodiments in which registers 104 of the exemplary processing system are adapted to store thirty-two bits, the exemplary processing system 100 may store 64-bit operands associated with an instruction, and operate on such 64-bit operands while in the second mode.

Similarly, an FPR in the first array 103 may store a first portion (e.g., most significant bits) of a floating-point operand associated with a floating-point instruction, and a FPR in the second array 105 may store a second portion (e.g., least significant bits) of the operand. More specifically, the first and second portions of the instruction may be stored in FPRs of the first and second arrays 103, 105, respectively, in tandem or simultaneously. Further, as illustrated by the second dotted box 202, the first and second FPUs 160, 174 may be coupled using carry propagation. In this manner, the first and second FPUs 160, 174 may operate on an operand, portions of which are stored in FPRs in the first and second arrays 103, 105, in tandem.

While operating in either the first or second mode, the exemplary processing system 100 may store a vector operands associated with a vector instruction therewith using one or more registers (e.g., VPRs) 104 in each of the first and second arrays 103, 105. For example, in some embodiments, the exemplary processing system 100 may receive and store 128-bit vector operands associated with a vector instruction (although a larger or smaller vector operand may be employed). Further, the exemplary processing system 100 may operate on such 128-bit operands. Consequently, the processing system 100 may divide the 128-bit operand into four portions (although the vector operand may be divided into a larger or smaller number of portions). For example, the first and third portions may be stored in respective registers (e.g., VPRs) of the first array 103, and the second and fourth portions may be stored in respective registers (e.g., VPRs) of the second array 105. A VMX 180, 182 may operate on the 128-bit operand in two cycles. For example, during a first cycle the VMX 180, 182 may operate on the first portion stored in the first array 103 and the second portion stored in the second array 105 in tandem. During a subsequent cycle (e.g., the next cycle) the VMX 180, 182 may operate on the third portion stored in the first array 103 and the fourth portion stored in the second array 105 in tandem. Carry propagation may be employed between the execution units (e.g., FXUs 154, 168 or FPUs 160, 174) that serve as VMXs 180, 182. Further, carry propagation may be employed between the VMX 180, 182 during the first and subsequent cycles in which the vector operation is performed. In a manner similar to that described in U.S. patent application Ser. No. 11/132, 656, filed on even date herewith and titled "METHODS AND APPARATUS FOR SHARING PROCESSOR RESOURCES", which is hereby incorporated by reference herein in its entirety, the exemplary processing system 100 may operate on a single thread or simultaneously operate on a plurality of threads. Further, the first VMX 180 may be employed for simple vector instructions and the second VMX 182 may be employed for complex vector instructions.

Figure 3:
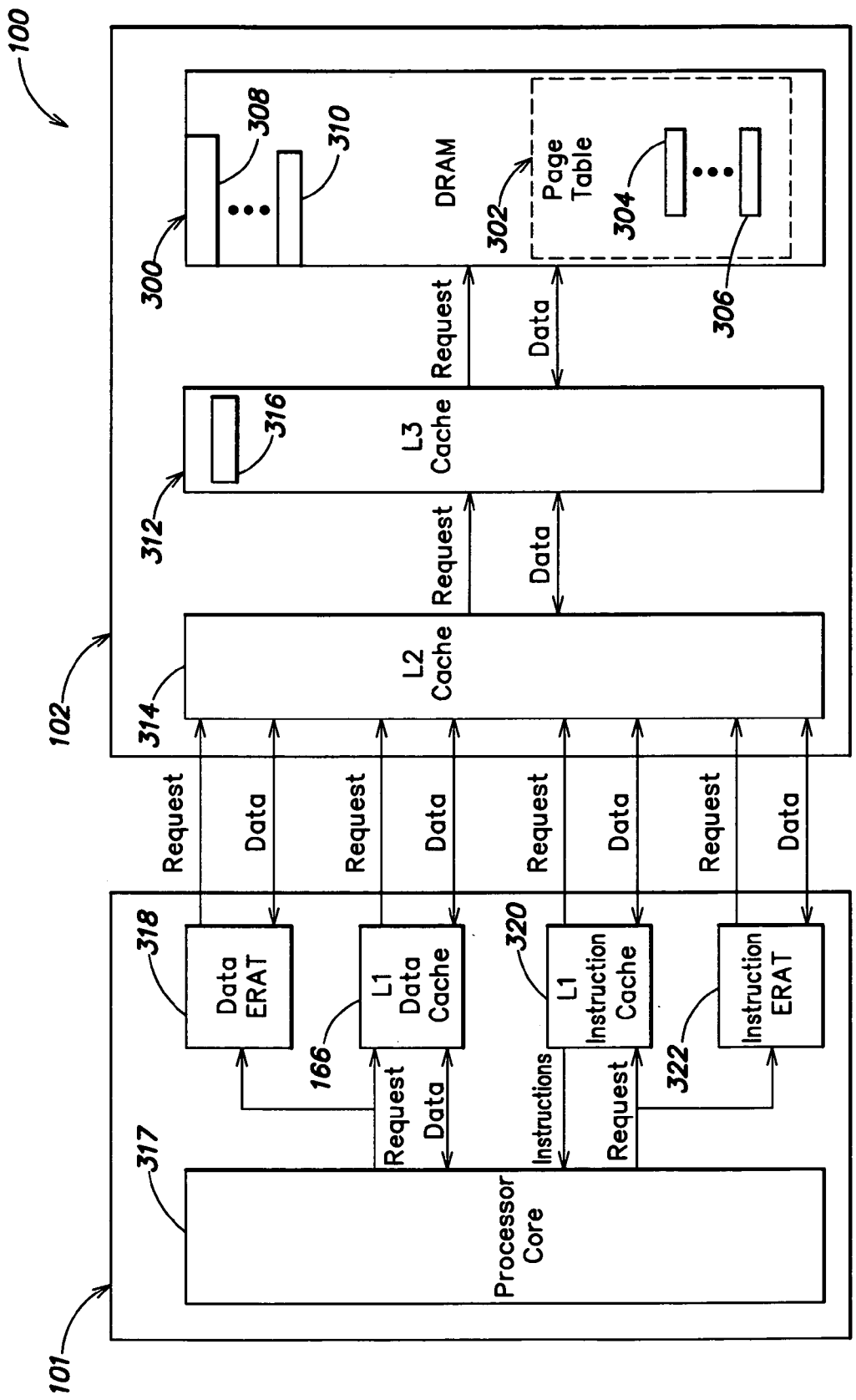
FIG. 3 is a block diagram of the exemplary processing system illustrating cache hierarchy in accordance with an embodiment of the present invention.

FIG. 3 is a block diagram of the exemplary processing system illustrating cache hierarchy in accordance with an embodiment of the present invention. With reference to FIG. 3, the memory system 102 of the processing system 100 may include a main memory 300 (e.g., DRAM or the like) adapted to store data and/or instructions. The main memory 300 may include a page table 302 which may include entries 304-306, each of which may be associated with one or more memory locations (e.g., pages) 308-310 of the main memory 300 and describes such memory locations 308-310. The page table 302 may support address translation and/or other types of page management. Details of a page table entry 304-306 in accordance with an embodiment of the present invention are described below with reference to FIG. 4. The memory system 102 may include an L3 cache memory 312 coupled to the main memory 300. Further, the memory system 102 may include an L2 cache memory 314 coupled to the L3 cache memory 312. The L2 and L3 cache memories 314, 312 may serve as unified cache memories. The L2 and L3 cache memories 314, 312 may be adapted to store one or more page table entries 304, 306 that may describe locations 308-310, respectively, and/or to store one or more cache lines 316 that may describe locations 308-310, respectively, of the main memory 300 recently accessed by the processor 101. Details of a cache line 316 in accordance with an embodiment of the present invention are described below with reference to FIG. 7.

The processor 101 may include a processor core 317, which may include the registers 104, execution units 154, 160, 168, 174, multiplexers 158, 172 and/or dispatch logic 153, coupled to the L1 data cache memory 166. The processor 101 may include Data ERAT logic 318 coupled to the processor core 317. The L1 Data cache memory 166 may be adapted to store one or more cache lines 316 that may describe locations 308-310, respectively, of the main memory 300 which store data (e.g., data operands) that were recently accessed by the processor 101. The Data ERAT logic 318 is adapted to store page table entries 304-306 associated with (e.g., describing) memory locations 308-130 that store data (e.g., data operands) which were recently accessed. In this manner, the Data ERAT logic 318 may enable the processor 101 to subsequently access such memory locations 308-310 faster. More specifically, the processor 101 may access such page table entries 304-306 from the Data ERAT logic 318 rather than the page table 302 in the main memory 300, thereby reducing a time for such access.

Similarly, the processor 101 may include an L1 Instruction cache memory 320 and Instruction ERAT logic 322 coupled to the processor core 317. The L1 Instruction cache memory 320 may be adapted to store one or more cache lines 316 that may describe locations 308-310, respectively, of the main memory 300 which store instructions that were recently accessed by the processor 101. The Instruction ERAT logic 322 is adapted to store page table entries 304-306 associated with memory locations 308-310 that store instructions, respectively, which were recently accessed. In this manner, the Instruction ERAT logic 322 may enable the processor 101 to subsequently access such memory locations 308-310 faster. More specifically, the processor 101 may access such page table entries 304-306 from the Instruction ERAT logic 322 rather than the page table 302 in the main memory 300, thereby reducing a time for such access.

Although the memory system 102 includes the L2 and L3 cache memories 314, 312, in some embodiments, the processor 101 may include the L2 and/or L3 cache memories 314, 312. Further, in some embodiments, the processing system 100 may not include the L3 cache memory 312.

In operation, to access a data operand, the processor core 317 may request the page table entry 304-306 associated with the memory location 308-310 storing the data operand from the Data ERAT logic 318 and/or may request the cache line 316 associated with the memory location 308-310 storing the data operand from the L1 Data cache memory 166. If the Data ERAT logic 318 is not storing the requested page table entry 304-306, the page table entry 304-306 may be requested from the L2 cache memory 314. If the L2 cache memory 314 is not storing the requested page table entry 304-306, the page table entry 304-306 may be requested from the L3 cache memory 312, and if the L3 cache memory 312 is not storing the requested page table entry 304-306, the page table entry 304-306 is requested from the main memory 300. Once the requested page table entry 304-306 is found (e.g., in the Data ERAT logic 318, L2 cache memory 314, L3 cache memory 312 or the main memory 300), the page table entry 304-306 may be provided to the Data ERAT logic 318, (e.g., and possibly the L2 cache 314, and/or L3 cache 312). Similarly, if the L1 Data cache memory 166 is not storing the requested cache line 316, the cache line 316 may be requested from the L2 cache memory 314. If the L2 cache memory 314 is not storing the requested cache line 316, the cache line 316 may be requested from the L3 cache memory 312, and if the L3 cache memory 312 is not storing the requested cache line 316, the cache line 316 may be requested from the main memory 300. Once the requested cache line 316 is found (e.g., in the L1 Data cache memory 166, L2 cache memory 314, L3 cache memory 312 or the main memory 300), the cache line 316 may be provided to the L1 Data cache memory 166, (e.g., and possibly the L2 cache 314, and/or L3 cache 312), and thereafter, to the processor core 317.

In a similar manner, to access an instruction, the processor core 317 may request a page table entry 304-306 associated with the memory location 308-310 storing the instruction from the Instruction ERAT logic 322 and/or may request the cache line 316 associated with the memory location 308-310 storing the instruction from the L1 Instruction cache memory 320. If the Instruction ERAT logic 322 is not storing the requested page table entry 304-306, the page table entry 304-306 may be requested from the L2 cache memory 314. If the L2 cache memory 314 is not storing the requested page table entry 304-306, the page table entry 304-306 may be requested from the L3 cache memory 312, and if the L3 cache memory 312 is not storing the requested page table entry 304-306, the page table entry 304-306 may be requested from the main memory 300. Once the requested page table entry 304-306 is found (e.g., in the Instruction ERAT logic 322, L2 cache memory 314, L3 cache memory 312 or the main memory 300), the page table entry 304-306 may be provided to the Instruction ERAT logic 322, (e.g., and possibly the L2 cache 314, and/or L3 cache 312). Similarly, if the L1 Instruction cache memory 320 is not storing the requested cache line 316, the cache line 316 may be requested from the L2 cache memory 314. If the L2 cache memory 314 is not storing the requested cache line 316, the cache line 316 may be requested from the L3 cache memory 312, and if the L3 cache memory 312 is not storing the requested cache line 316, the cache line 316 may be requested from the main memory 300. Once the requested cache line 316 is found (e.g., in the L1 Instruction cache memory 320, L2 cache memory 314, L3 cache memory 312 or the main memory 300), the cache line 316 may be provided to the L1 Instruction cache memory 320, (e.g., and possibly the L2 cache 314, and/or L3 cache 312), and thereafter, to the processor core 317.

Figure 4:
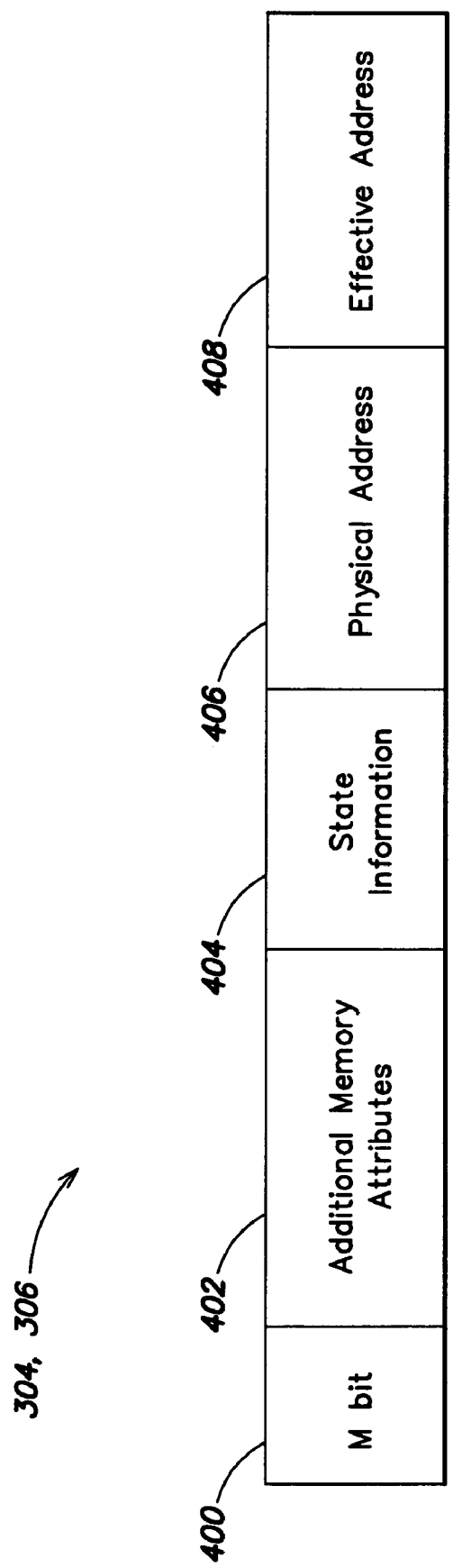
FIG. 4 is a block diagram of page table entry data structure in accordance with an embodiment of the present invention.

FIG. 4 is a block diagram of page table entry data structure in accordance with an embodiment of the present invention. With reference to FIG. 4, the page table entry data structure 304, 306 may include a memory attribute 400 indicating an operand size associated with an instruction stored in the memory locations 308-310 described by the page table entry 304, 306. In some embodiments, the memory attribute 400 indicating an operand size associated with an instruction may be a single bit (e.g., an M bit). In this manner, the memory attribute 400 may indicate an instruction stored in the memory locations 308-310 described by the page table entry 304, 306 is of a first type (e.g., associated with 32-bit operands) or of a second type (e.g., associated with 64-bit operands). However, the memory attribute 400 may be a larger number of bits, and thereby, indicate an instruction stored in the memory locations 308-310 described by the page table entry 304, 306 is one of a plurality of sizes. Consequently, the present invention may extend each page table entry to include an additional memory attribute 400 for each page used for storing instructions. The memory attribute 400 corresponding to a page may designate whether the page stores 32-bit or 64-bit operands associated with instruction code.

The page table entry data structure 304, 306 may include additional memory attributes 402, state information 404, a physical address 406 associated with the instructions or data stored in the memory locations 308-310 described by the page table entry 304, 306, and/or an effective address 408 associated with the instructions or data stored in the memory locations 308-310 described by the page table entry 304, 306 similar to that included in conventional page table entry data structures. The additional memory attributes 402 may indicate whether data stored in the memory locations 308-310 is cacheable, guarded, coherent and/or write-protected (although the memory attributes 402 may indicate other information about data stored in the memory locations 308-310).

Figure 5:
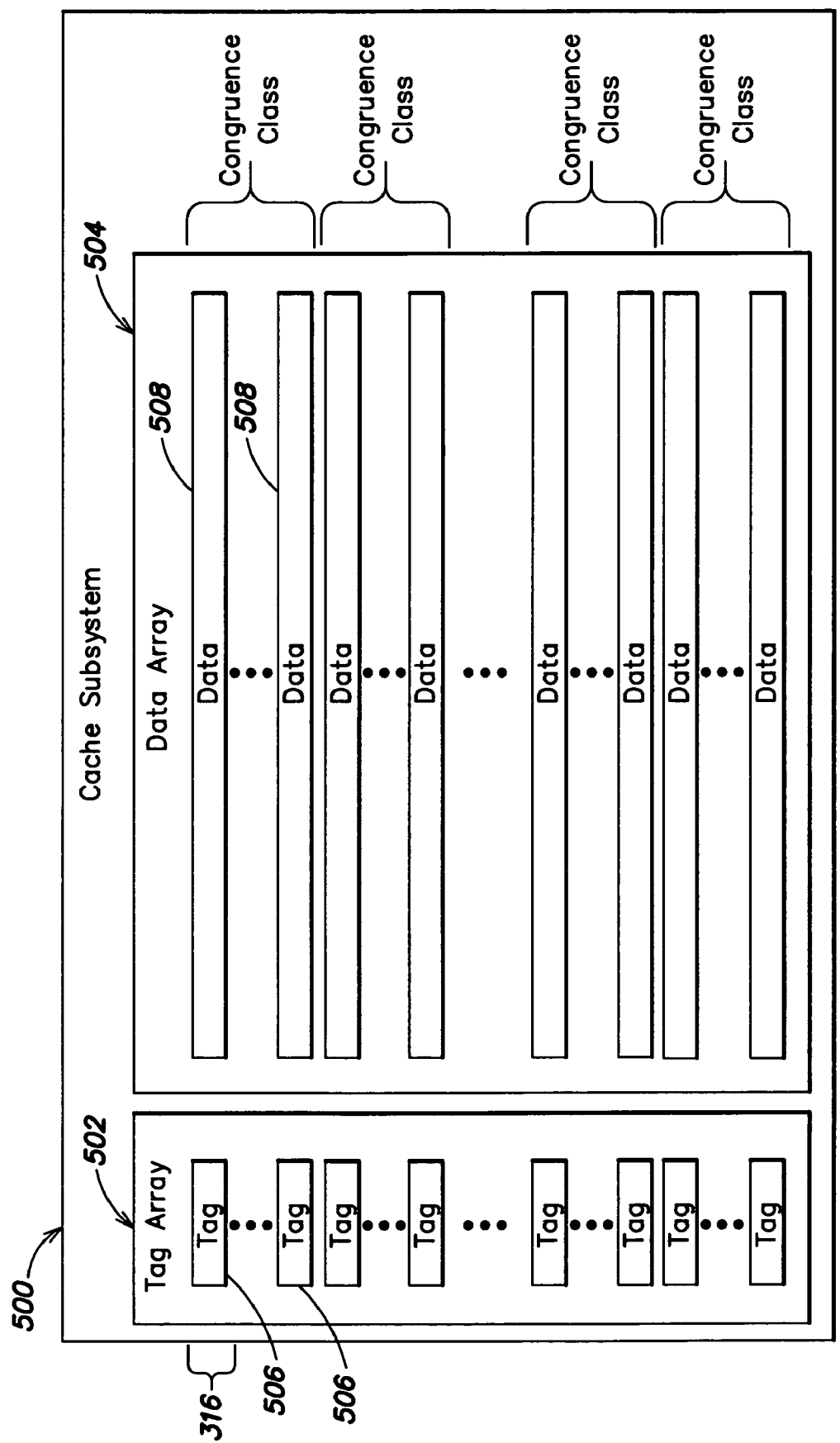
FIG. 5 is a block diagram of cache architecture in accordance with an embodiment of the present invention.

FIG. 5 is a block diagram of cache architecture in accordance with an embodiment of the present invention. With reference with FIG. 5, the L1 data cache memory 166, L1 Instruction cache memory 320, L2 cache memory 314 and/or L3 cache memory 312 may have the same architecture 500. More specifically, each such cache memory 166, 320, 314, 312 may include a tag array 502 and a data array 504. The tag array 502 may include a plurality of tag entries 506 which correspond to one or more portions of a memory location 308-310. Similarly, the data array 504 may include a plurality of data entries 508 for storing data (e.g., operands, instructions, etc.) which correspond to one or more portions of a memory location 308-310. Each data entry 508 may correspond to a tag entry 506. Together a tag entry 506 and data entry 508 corresponding therewith may form a cache line 316. A plurality of cache lines 316 in a cache memory 166, 320, 314, 312 may be grouped into a congruence class, or group of cache lines 316 that are referenced by the same index (typically formed from the address of a memory location 308-310 with some most significant and least significant bits ignored).

Figure 6:
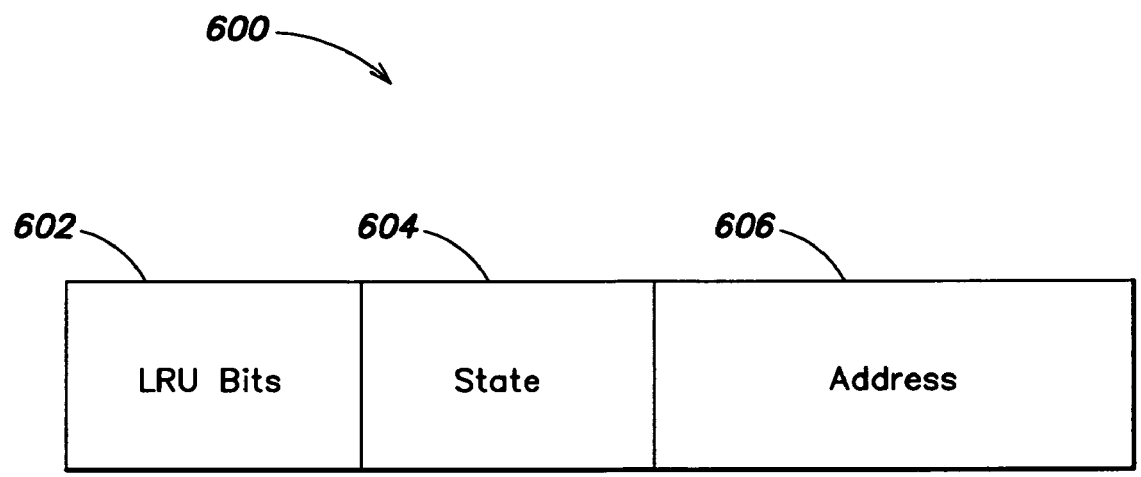
FIG. 6 is a block diagram of a conventional cache tag entry data structure.

FIG. 6 is a block diagram of a conventional cache tag entry data structure. With reference to FIG. 6, the conventional cache tag entry data structure 600 includes bits (e.g., least recently used (LRU) bits) 602 for indicating relative frequency with which cache lines of a cache memory are used. Further, the conventional cache tag entry data structure 600 includes state information 604, which may indicate data which has been altered, and an address 606 associated with memory locations 308-310 originating the data currently being held by the cache line 316.

Figure 7:
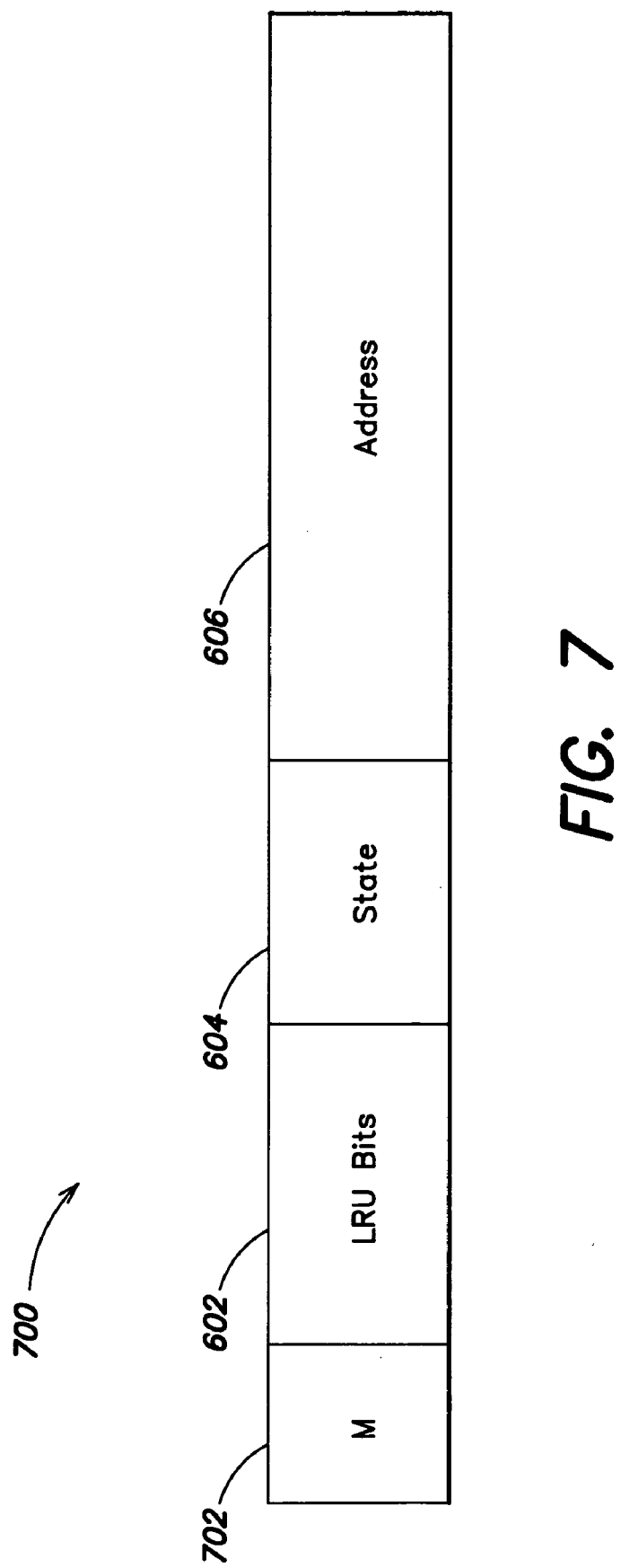
FIG. 7 is a block diagram of a cache tag entry data structure in accordance with an embodiment of the present invention.

FIG. 7 is a block diagram of a cache tag entry data structure in accordance with an embodiment of the present invention. With reference to FIG. 7, the cache tag entry data structure 700 in accordance with an embodiment of the present invention may include bits (e.g., LRU bits) 602 for indicating relative frequency with which cache lines 316 of a cache memory 166, 320, 314, 312 are used. Further, the cache tag entry data structure 700 may includes state information 604, which may indicate data which has been altered, and an address 606 associated with memory locations 308-310 originating the data currently being held by the cache line 316. In contrast to the conventional cache tag entry data structure 600, the cache tag entry data structure 700 may include an attribute 702 indicating an operand size associated with an instruction stored in one or more portions of the memory locations 308-310 described by the cache line 316. In some embodiments, the processor core 317 may provide the attribute 702 indicating an operand size associated with the instruction stored in one or more portions of the memory locations 308-310 from the memory attribute 400 in the page table entry 304, 306. In this manner, the processing system 100 may employ (e.g., map) the memory attribute 400 of a page table entry 304, 306 which indicates an operand size associated with an instruction stored in the memory locations 308-310 described by the page table entry 304, 306, in a cache line 116 in accordance with an embodiment of the present invention. Because the memory attribute 400, 702 indicates an operand size associated with an instruction stored in a memory location 308, 310, such memory attribute 400, 702 may be ignored if stored in a page table entry 304, 306 and/or cache line 316 describing a memory location 308, 310 storing a data operand. Consequently, cache lines 316 of the L1 Data cache memory 166 may not be required to include the memory attribute 702.

Figure 8:
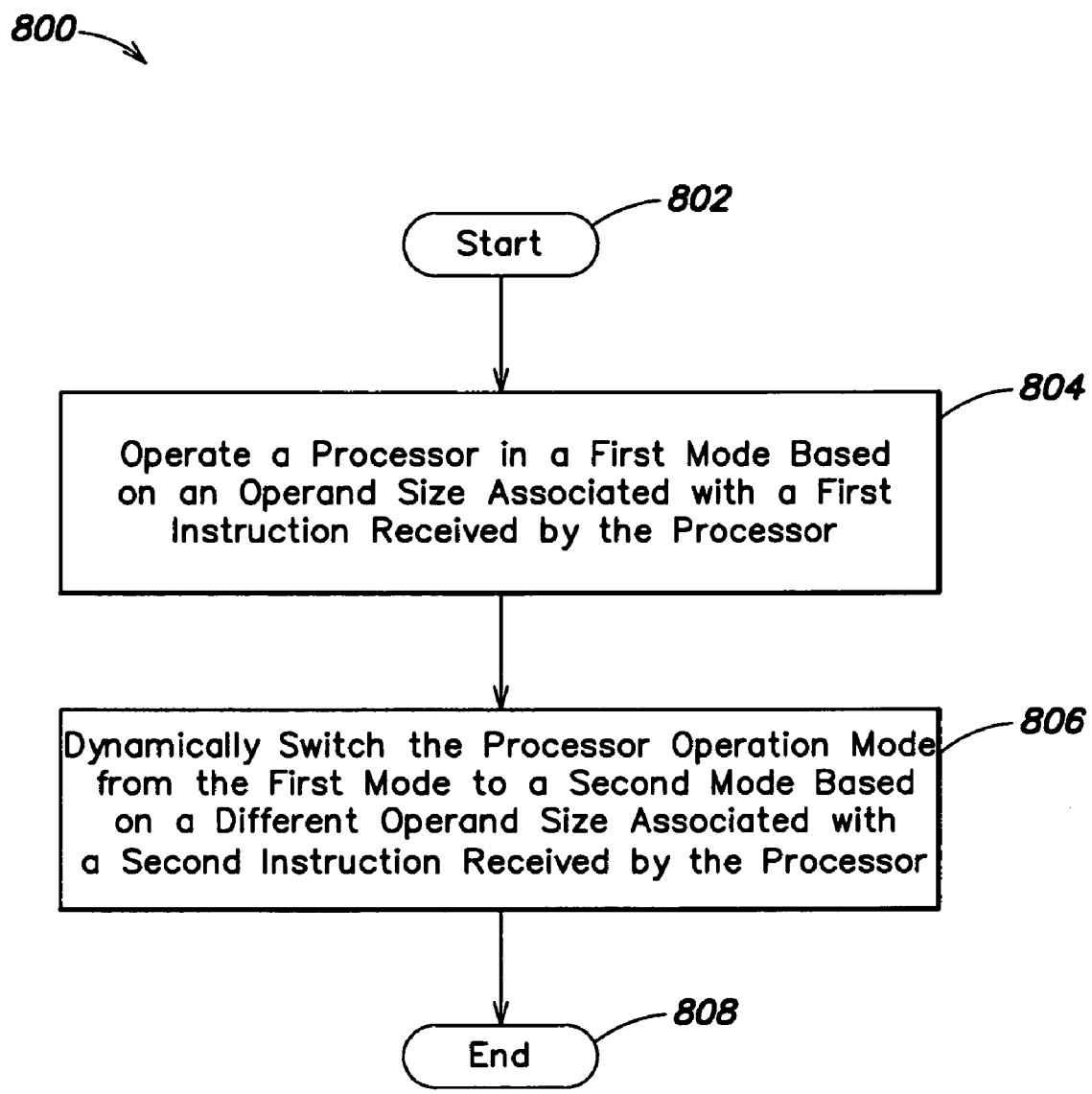
FIG. 8 illustrates a processing method in accordance with an embodiment of the present invention.

The operation of the processing system 100 is now described with reference to FIGS. 1-7 and with reference to FIG. 8 which illustrates a processing method in accordance with an embodiment of the present invention. With reference to FIG. 8, in step 802, the method 800 begins. In step 804, a processor 101 may be operated in a first mode based on an operand size associated with a first instruction received by the processor 101. For example, a processor core 317 of the processor 101 may receive an instruction stored in a memory location 308-310 from the L1 Instruction cache 320 in response to a request for the instruction stored in the memory location 308-310. The L1 Instruction cache 320 may retrieve the requested information from a higher-order memory, such as the L2 cache memory 314, L3 cache memory 312 or the main memory 300, if such information is not stored in the L1 Instruction cache memory 320. The processor core 317 may detect a state of the attribute 702 indicating an operand size associated with the instruction stored in one or more portions of the memory locations 308-310 described by the cache line 316. In this manner, the processor core 317 may determine the size of operands associated with the instruction, and control the processor mode of operation based on the instruction operand size. For example, if the processor core 317 determines a size of operands for an instruction is 32-bit, the processor core 317 may operate the processor 101 in a first mode. While operating in such mode, and simultaneously executing two instruction streams (e.g., SMT or simultaneous multi-threading), the processor 101 may store a first received 32-bit integer operand associated with a first received instruction from a first instruction stream in a GPR of the first array 103. Similarly, the processor 101 may store a second received 32-bit integer operand associated with a second received instruction from a second instruction stream in a GPR of the second array 105. Alternatively, every instruction may store an associated 32-bit integer operand to both arrays 103 and 105 when executing a single instruction stream. While operating in the first mode, one or more of the integer execution units (FXUs) 154, 168 may independently operate on integer operands. For example, the first FXU 154 may operate on a first 32-bit operand associated with the first instruction and the second FXU 168 may operate on a second 32-bit operand associated with the second instruction (e.g., during the same time).

Additionally or alternatively, while operating in the first mode, and simultaneously executing two instruction streams (e.g., SMT or simultaneous multi-threading), the processor 101 may store a first received 32-bit floating-point operand associated with a first received instruction from a first instruction stream in respective FPRs of the first array 103. Similarly, the processor 101 may store a second received 32-bit floating-point operand associated with a second received instruction from a second instruction stream in respective FPRs of the second array 105. Alternatively, every instruction may store an associated 32-bit floating point operand to both arrays 103 and 105 when executing a single instruction stream. While operating in the first mode, one or more of the floating-point execution units (FPUs) 160, 174 may independently operate on floating-point operands. For example, the first FPU 160 may operate on an operand associated with the first 32-bit instruction and the second FPU 174 may operate on an operand associated with the second 32-bit instruction (e.g., during the same time). Further, while operating in the first mode, at least one of the FXUs 154, 168 may operate on an integer operand and at least one of the FPUs 160, 174 may operate on a floating-point operand at the same time. In this manner, while operating in the first mode, the processing system 100 efficiently may employ resources (e.g., registers 104 and executions units 154, 160, 168, 174). For example, extra read ports from a register array 103, 105 may be employed to feed additional execution units coupled to the output thereof. The scenario described above is exemplary. The processor 101 may receive, store and/or operate on instructions of the first size in a different manner. For example, the processor 101 may receive, store and/or operate on a larger or smaller number of integer and/or floating-point instructions. In this manner, when the processor 101 receives an instruction associated with operands of the first size, the processor 101 may issue the instruction to any one of the appropriate execution units.

The processor 101 may continue to operate in the first mode as the processor 101 receives instructions associated with operands of the first size (e.g., 32-bit). However, in step 806, the processor may dynamically switch operation mode from the first mode to a second mode based on a different operand size associated with a second instruction received by the processor. For example, while operating in the first mode, the processor core 317 of the processor 101 may receive an instruction stored in a memory location 308-310 from the L1 Instruction cache memory 320 (e.g., a cache line 316 thereof) in response to a request for the instruction stored in the memory location 308-310. As stated, the processor core 317 may detect a state of the attribute 702 indicating an operand size associated with the instruction stored in one or more portions of the memory locations 308-310 described by the cache line 316 of the L1 Instruction cache memory 320. In this manner, the processor core 317 may determine the received instruction is associated with operands of a second size (e.g., 64-bit). Consequently, the processor core 317 may dynamically switch operation of the processor 101 to the second mode. In the second mode, the processor 101 may store a first portion (e.g., the first thirty-two bits) of a first received integer operand of the second size associated with the instruction in a GPR of the first array 103 and a second portion (e.g., the remaining thirty-two bits) of the integer operand of the second size associated with the instruction in a GPR of the second array 105. One or more additional operands of the second size associated with the first received integer instruction may be stored in a similar manner. While operating in the second mode, a plurality of the integer execution units (FXUs) 154, 168 may operate on integer operands of the second size associated with the first received integer instruction in tandem. For example, the first FXU 154 may operate on the first portion of the integer operand of the second size (e.g., 64-bit operand) associated with the first received integer instruction and the second FXU 168 may operate on the second portion of the integer operand of the second size associated with the first received integer instruction (e.g., in tandem). The processor 101 may enable carry propagation between the plurality of FXUs 154, 168 operating on an integer operand in tandem while in the second mode. While operating in the second mode, the processor 101 may receive, store and operate on subsequently-received integer instructions and operands of the second size associated therewith in a similar manner.

Additionally or alternatively, the processor 101 may store a first portion (e.g., the first thirty-two bits) of a first received floating-point operand of the second size (e.g., 64-bit) associated with a first floating-point instruction in an FPR of the first array 103 and a second portion (e.g., the remaining thirty-two bits) of the floating-point operand associated with the instruction in an FPR of the second array 105. One or more additional operands of the second size associated with the first floating-point instruction may be stored in a similar manner. While operating in the second mode, a plurality of the floating-point execution units (FPUs) 160, 174 may operate on floating-point operands associated with the first floating-point instruction in tandem. For example, the first FPU 160 may operate on the first portion of the floating-point operand of the second size (e.g., 64-bit) associated with the first floating-point instruction and the second FPU 174 may operate on the second portion of the floating-point operand of the second size associated with the first floating-point instruction of the second size (e.g., in tandem). The processor 101 may enable carry propagation between the plurality of FPUs 160, 174 operating on a floating-point operand in tandem while in the second mode. Further, while operating in the second mode, at least one plurality of the FPUs 160, 174 may operate on a floating-point operand and at least one plurality of the FXUs 154, 168 may operate on an integer operand at the same time. In this manner, while operating in the second mode, the processor system 100 efficiently may employ resources (e.g., registers 104 and executions units 154, 160, 168, 174). However, because registers 104 may independently store operands of a first size associated with an instruction, and independently operate on such operands while in the first mode, the processor 101 may more efficiently use resources in the first mode than in the second mode. The scenario described above is exemplary. The processor 101 may receive, store and/or operate on instructions of the second size in a different manner. For example, the processor 101 may receive, store and/or operate on a larger or smaller number of integer and/or floating-point instructions. In this manner, when the processor 101 receives an instruction associated with operands of the second size, the processor 101 may issue the instruction to a pair of execution units of the first size connected using carry propagation.

Thereafter, the processor 101 may dynamically switch operation mode from the second mode to the first mode based on a different operand size associated with a subsequent instruction received by the processor 101. For example, while operating in the second mode, the processor core 317 may determine a subsequently-received instruction is associated with operands of the first size (in the manner described above), and consequently, the processor core 317 may dynamically switch operation of the processor 101 from the second mode to the first mode.

Thereafter, step 808 may be performed. In step 808, the method 800 ends. Through use of the present methods a processor 101 may dynamically switch modes during operation, thereby processing instructions that may be of at least two different types. More specifically, the processor 101 may switch modes of operation without requiring the processing system 100 to be stopped or brought to a quiescent mode. Further, the processor 101 may employ a single set of FXUs 154, 168 to perform operations on an integer operand of a second size (e.g., 64-bit) and/or a single set of FPUs 160, 174 to perform operations on a floating-point operand of the second size. In this manner, the present invention may reduce an overall number of such registers and/or execution units required by a processing system. Consequently, the present methods and apparatus may reduce the amount of silicon area required by the processing system and power consumed thereby.

Figure 9:
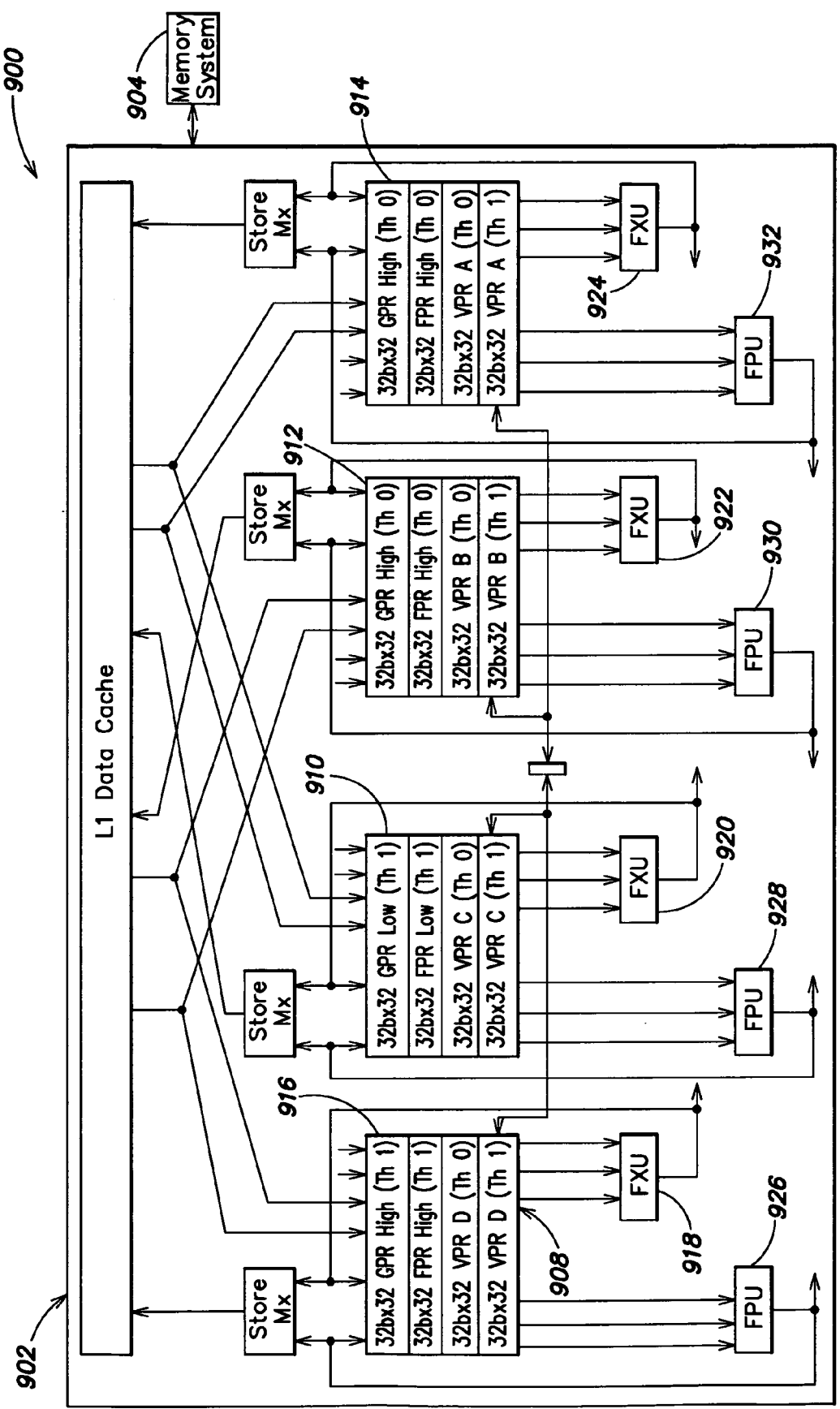
FIG. 9 is a block diagram of another exemplary processing system that can dynamically switch modes operating in a first mode in accordance with an embodiment of the present invention.

FIG. 9 is a block diagram of another exemplary processing system that can dynamically switch modes operating in a first mode in accordance with an embodiment of the present invention. With reference to FIG. 9, the other exemplary processing system 900 that can dynamically switch modes may be similar the exemplary processing system 100. For example, the processing system 900 includes a processor 902 coupled to a memory system 904. In contrast to the processing system 100 of FIGS. 1 and 2, the processing system 900 may include a larger number of register arrays and a larger number of execution units. More specifically, a processor 902 of the processing system 900 may include four register arrays 908-914 (although a larger or smaller number of register arrays may be employed). Each register array 908-914 may include a plurality of registers 916. For example, each register array 908-914 may include thirty-two 32-bit GPRS, thirty-two 32-bit FPRs and sixty-four 32-bit VPRS. However, one or more of the register arrays 908-914 may include a larger or smaller number of GPRs, FPRs and/or VPRs. Further, one or more of the GPRs, FPRs and/or VPRs may be of a larger or smaller size.

Similar to the processing system 100 of FIGS. 1 and 2, execution units such as FXUs 918-924 and FPUs 926-932 may be coupled, respectively, to outputs of the registers arrays 908-914. In this manner, the processor 902 may operate on operands associated with an instruction received by the processor 902.

The other exemplary processing system 900, which may dynamically switch modes, is shown operating in a first mode. The first mode may be a thirty-two bit mode in which the exemplary processing system 900 receives instructions for processing 32-bit operands. For example, in the first mode, a 32-bit integer data operand associated with an integer instruction may be stored in a GPR of the first array 908. The first FXU 918 may operate on the data operand associated with integer instruction. Similarly, in the first mode, a 32-bit floating-point data operand associated with a floating-point instruction may be stored in an FPR of the first array 908. The first FPU 926 may operate on the data operand associated with floating-point instruction.

While operating in the first mode, during the same time that registers 916 in the first array 908 are storing data operands and executing instructions associated therewith, data may be stored in the second, third and/or fourth register array 910, 912, 914 in a similar manner. For example, a 32-bit integer data operand associated with an integer instruction may be stored in a GPR of the second array 910. The second FXU 920 may operate on the data operand associated with integer instruction. Similarly, in the first mode, a 32-bit floating-point data operand associated with the floating-point instruction may be stored in an FPR of the second array 910. The second FPU 928 may operate on the data operand associated with floating-point instruction. In this manner, registers 916 in the first through fourth arrays 908-914 may store data operands associated with the instructions, respectively, at the same time. In a preferred configuration, while operating in the first mode (e.g., 32-bit) data is duplicated in pairs of arrays, allowing multiple execution units to operate on the same set of operands. For example, when FXU 918 or FPU 926 stores a result operand into a GPR or FPR register within register array 908, the same data is also stored in a corresponding position within register array 910. Likewise, when FXU 920 or FPU 928 stores a result operand into a GPR or FPR register within register array 910, the same data is also stored in a corresponding position within register array 908. In a similar manner, FXUs 922, 924 and FPUs 930, 932 work together with register arrays 912 and 914. These cross connections are not shown explicitly in FIG. 9, but are implied by the arrows out of the bottom of the execution units (e.g., FXUs, FPUS) 918, 920, 922, 924, 926, 928, 930, 932 and arrows into the top of register arrays 908, 910, 912, 914.

In this manner, while operating in the first mode, a GPR in the processing system 900 may store an entire integer operand associated with an integer instruction, and an FPR in the processing system 900 may store an entire floating-point operand associated with a floating-point instruction. Further, an execution unit (e.g., FPU, FXU) included in the exemplary processing system 900 may operate on an entire operand associated with an instruction (e.g., independently). In this manner, the exemplary processing system 900 efficiently may use registers (e.g., GPRs and FPRs) 916 and/or execution units (e.g., FXUs and FPUs) while operating in the first mode.

Figure 10:
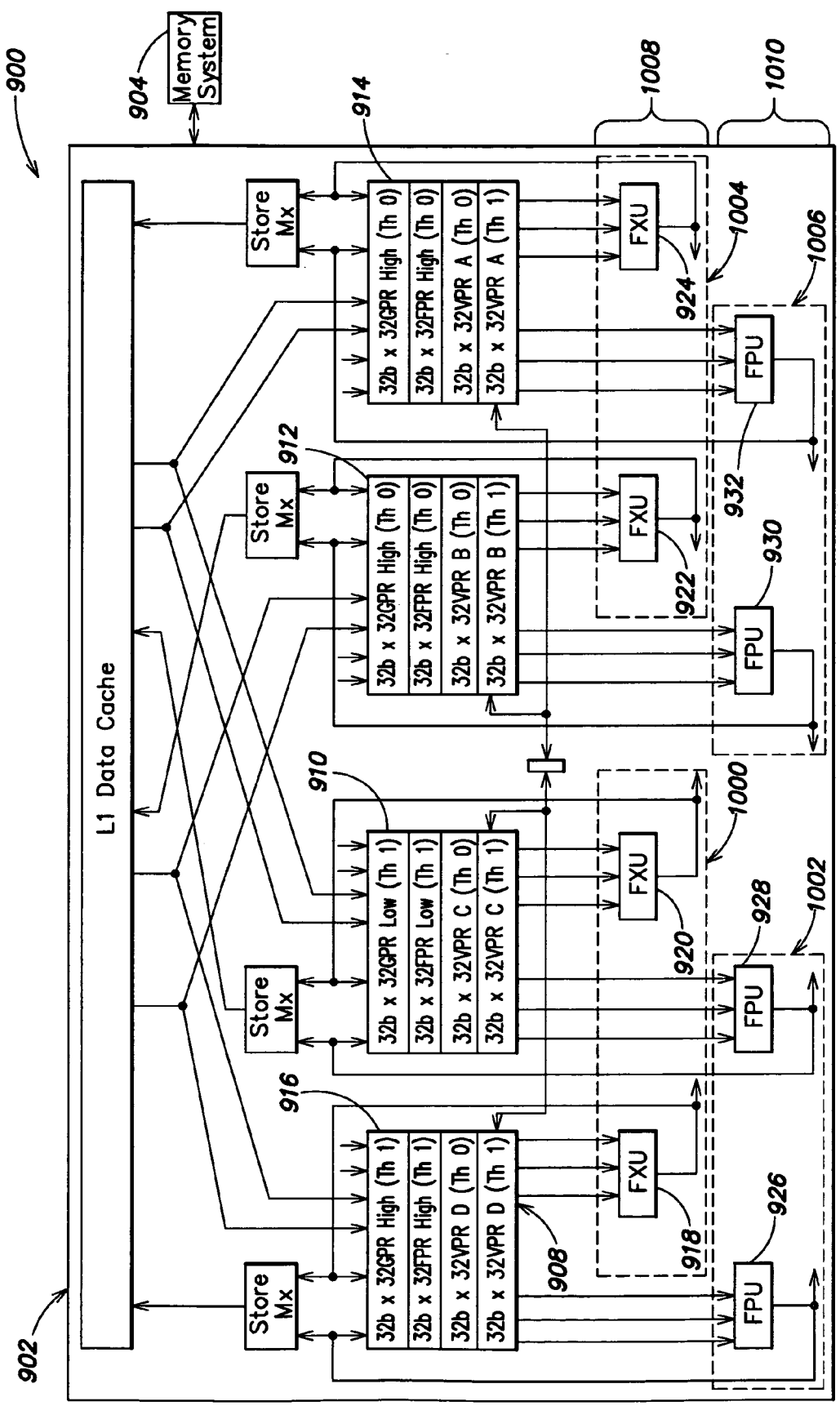
FIG. 10 is a block diagram of the other exemplary processing system that can dynamically switch modes operating in a second mode in accordance with an embodiment of the present invention.

FIG. 10 is a block diagram of the other exemplary processing system that can dynamically switch modes 900 operating in a second mode in accordance with an embodiment of the present invention. With reference to FIG. 10, while operating in the second mode, registers 916 in a plurality of register arrays 908-914 may be employed to store an operand associated with an instruction. For example, registers 916 in both the first and second arrays 908, 910 may be employed to store an operand associated with an instruction (e.g., an integer or floating-point instruction). More specifically, a GPR in the first array 908 may store a first portion (e.g., most significant bits) of an integer operand, and a GPR in the second array 910 may store a second portion (e.g., least significant bits) of the operand. The first and second portions of the operand may be stored in a GPR of the first and second arrays 908, 910, respectively, in tandem or simultaneously. Further, a plurality of execution units (e.g., an execution unit coupled to the first array 908 and an execution unit coupled to the second array 910) may operate, in tandem, on an operand associated with the integer instruction. As illustrated by the first dotted box 1000, the first and second FXUs 918, 920 may be coupled using carry propagation. In this manner, the first and second FXUs 918, 920 may operate on an operand, portions of which are stored in GPRs in the first and second arrays 908, 910, in tandem. Therefore, for embodiments in which registers 916 of the exemplary processing system 900 are adapted to store thirty-bits, the exemplary processing system 100 may store 64-bit operands associated with an instruction, and operate on such 64-bit operands while in the second mode.

Similarly, an FPR in the first array 908 may store a first portion (e.g., most significant bits) of a floating-point operand, and an FPR in the second array 910 may store a second portion (e.g., least significant bits) of the operand. More specifically, the first and second portions of the operand may be stored in an FPR of the first and second arrays 908, 910, respectively, in tandem or simultaneously. Further, as illustrated by the second dotted box 1002, the first and second FPUs 926, 928 may be coupled using carry propagation. In this manner, the first and second FPUs 926, 928 may operate on an operand, portions of which are stored in FPRs in the first and second arrays 908, 910, in tandem.

Further, while operating in the second mode, the processor 902 may employ the third and fourth register arrays 912, 914 and execution units 922-924, 930-932 coupled to the outputs thereof in a manner similar to the first and second register arrays 908, 910 and execution units 918-920, 926-928 coupled to the outputs thereof. In this manner, registers 916 in both the third and fourth register arrays 912, 914 may be employed to store an operand associated with an instruction (e.g., an integer or floating point instruction). Further, a plurality of execution units (e.g., an execution unit coupled to the third array 912 and an execution unit coupled to the fourth array 914) may operate, in tandem, on an operand associated with the instruction. As illustrated by the third dotted box 1004, the third and fourth FXUs 922, 924 may be coupled using carry propagation. In this manner, the third and fourth FXUs 922, 924 may operate on an operand, portions of which may be stored in GPRs in the third and fourth register arrays 912, 914, in tandem. Similarly, as illustrated by the fourth dotted box 1006, the third and fourth FPUs 930, 932 may be coupled using carry propagation. In this manner, the third and fourth FPUs 930, 932 may operate on an operand, portions of which may be stored in FPRs in the third and fourth register arrays 912, 914, in tandem. Therefore, the processing system 900 may operate on a plurality of 64-bit operands at the same time.

While operating in either the first or second mode, the exemplary processing system 100 may store a vector operands associated with a vector instruction therewith using one or more registers (e.g., VPRs) 104 in each of the first and second arrays 103, 105. For example, in some embodiments, the exemplary processing system 100 may receive and store 128-bit vector operands associated with a vector instruction (although a larger or smaller vector operand may be employed). Further, the exemplary processing system 100 may operate on such 128-bit operands. Consequently, the processing system 100 may divide the 128-bit operand into four portions (although the vector operand may be divided into a larger or smaller number of portions). For example, the first and third portions may be stored in respective registers (e.g., VPRs) of the first array 103, and the second and fourth portions may be stored in respective registers (e.g., VPRs) of the second array 105. A VMX 180, 182 may operate on the 128-bit operand in two cycles. For example, during a first cycle the VMX 180, 182 may operate on the first portion stored in the first array 103 and the second portion stored in the second array 105 in tandem. During a subsequent cycle (e.g., the next cycle) the VMX 180, 182 may operate on the third portion stored in the first array 103 and the fourth portion stored in the second array 105 in tandem. Carry propagation may be employed between the execution units (e.g., FXUs 154, 168 or FPUs 160, 174) that serve as VMXs 180, 182. Further, carry propagation may be employed between the VMX 180, 182 during the first and subsequent cycles in which the vector operation is performed. In a manner similar to that described in U.S. patent application Ser. No. 11/132, 656, filed on even date herewith and titled "METHODS AND APPARATUS FOR SHARING PROCESSOR RESOURCES", which is hereby incorporated by reference herein in its entirety, the exemplary processing system 100 may operate on a single thread or simultaneously operate on a plurality of threads. Further, the first VMX 180 may be employed for simple vector instructions and the second VMX 182 may be employed for complex vector instructions.

In this manner the processor 902 may partition a 64-bit execution unit into a pair of 32-bit execution unit with connecting carry propagation. Vector operands associated with a vector instruction may be partitioned into vector elements such that the individual vector elements may be processed. Because the registers arrays 908-914 may be partitioned into 32-bit slices (e.g., each register may store thirty-two bits), operands associated with an instruction may be independently accessed from a register 916 while the processing system 900 operates in the first mode. Further, the data output of an execution unit coupled to a first register array may be input to a write port of a remaining register array in the processor 902. In this manner, an execution unit may access data from any register array 908-914.

When operating in a mode that supports simultaneous threads (SMT), use of an execution unit may be restricted to a single thread. As a further example, when operating in a single-threaded mode on 64-bit instructions and/or operands associated therewith using a first pair of register arrays and execution units (e.g., using the first and second register arrays 908-910 and execution units coupled thereto 918-920, 926-928), write ports of remaining register arrays 912-914 may be employed to duplicate data stored in the first pair of register arrays.

While operating in the first mode, the write ports of the processor 902 may enable twice the number of register ports to feed data to execution units in single-thread mode or simultaneous thread mode. Further, it should be noted that a different set of registers arrays 908-914 may be employed to operate on a first and second thread in SMT mode while the processor 902 operates in the first mode than while the processor 902 operates in the second mode.

The foregoing description discloses only exemplary embodiments of the invention. Modifications of the above disclosed apparatus and methods which fall within the scope of the invention will be readily apparent to those of ordinary skill in the art. For instance, although in the embodiments described above, the first mode is a 32-bit mode and the second mode is a 64-bit mode, in other embodiments, the first mode may be the 64-bit mode and the second mode may be the 32-bit mode. Although the present invention is described with reference to processing system 100, 900 which employs a unified register stack, a processing system in accordance with an embodiment of the invention does not require a unified register stack. For example, in a broader aspect, the present invention may provide processing methods and apparatus for (1) operating a processor in a first mode based on an operand size associated with a first instruction received by the processor; and (2) dynamically switching the processor operation mode from the first mode to a second mode based on a different operand size associated with a second instruction received by the processor.

In summary, in some embodiments, the present methods and apparatus may provide a processing system with:
GPRs—32 registers×8 bytes×2 threads=512 bytes
FPRs—32 registers×8 bytes×2 threads=512 bytes
VPRs—32 registers×16 bytes×2 threads=1024 bytes.
Therefore, a total of 2048 bytes may be stored in a single array, which may be partitioned into 4×32-bit slices, and may include a total of twelve read ports and/or twelve write ports. In SMT mode, a thread may have affinity to one FXU and one FPU thereby avoiding requiring another 1024 bytes. Further, in single-threaded mode, contents of GPRs and FPRs that are associated with a first thread may be duplicated in GPRs and FPRs associated with a second thread. Further, the present invention may be employed by processing systems that employ register renaming as described in U.S. patent application Ser. No. 11/132,656, filed on even date herewith and titled "METHODS AND APPARATUS FOR SHARING PROCESSOR RESOURCES", which is hereby incorporated by reference herein in its entirety.

While operating on simultaneous threads in the second mode (e.g., 64-bit mode), a processor of the present invention may operate on one floating-point, one integer and one branch instruction per thread per cycle. A load or store operation may be substituted for either or both of the floating-point and integer instructions. The processor may perform a maximum of one store operation per thread and a maximum of two total load operations across both threads. Although the design of a processor included in some embodiments is described above, in other embodiments, the processor may be configured differently. For example, one or more of the parameters described above may be different.

While operating on a single thread in the second mode (e.g., 64-bit mode), a processor of the present invention may operate on two floating-point, two integer and one branch instruction per cycle. A load or store operation may be substituted for either or both of the floating-point and integer instructions. The processor may perform a maximum of two load and two store operations.

While operating on simultaneous threads in the first mode (e.g., 32-bit mode), a processor of the present invention may operate on two floating-point, two integer and one branch instruction per thread per cycle. A load or store operation may be substituted for either or both of the floating-point and/or integer instructions. The processor may perform a maximum of two load and two store operations per thread.

While operating on a single thread in the first mode (e.g., 32-bit mode), a processor of the present invention may operate on four floating-point, four integer, and one branch instruction per cycle. A load or store operation may be substituted for either or both of the floating-point and integer instructions. The processor may perform a maximum of four load and four store instructions.

To operate on a complex vector instruction, a processor of the present invention may employ all FPUs. Further, to operate on a simple vector instruction or a permute instruction, the processor may employ all FXUs. A load or store operation may be substituted for either or both instructions.

In this manner, the present methods and apparatus may provide advantages (e.g., compared to conventional processor) such as a significant reduction in silicon area required and/or power consumed, a consolidation of register resources into a single array, minimizing total number of required read and write ports, employing a VMX that may largely include one or more FXUs and/or FPUs, register ports and an adder for FXUs and FPUs may be shared with load/store operations, and area required and power consumed is based on 32-bit resources for 32-bit applications.

Further, the present methods and apparatus may improve and/or maximize utilization of resources by allowing a single execution unit to support an integer instruction, load operation, store operation, or one element of a simple vector operation and/or by allowing a single execution unit to support a floating-point instruction, load operation, store operation or one element of a complex vector operation.

The present methods and apparatus may support vector applications without a significant penalty on applications which may not use vectors, may support multi-threaded applications without imposing a significant penalty on applications that are not multi-threaded, may support a dynamic mixture of an application of a first size (e.g., 32-bit) and a second size (e.g., 64-bit). For example, in a 64-bit mode, two 32-bit execution units may work in tandem. Further, the present methods and apparatus may double a number of execution units available to 32-bit applications. The present invention may employ a memory attribute in entries of a page table to control switching between the first mode (e.g., 32-bit mode) and the second mode (e.g., 64-bit mode). Further, at least one bit in a cache line may be employed to track the memory attribute in a corresponding page table entry to control switching between modes. In this manner, the present invention may support global memory access functions which may run in the second mode (e.g., 64-bit mode). For example, a system call may be made to a function in a memory location (e.g., page) associated with an attribute indicating a second (e.g., 64-bit operands) instruction type. Further, the present invention may support most integer applications which may run in the first mode (e.g., 32-bit mode). For example, such integer application code may be stored in a memory location (e.g., a page) associated with an attribute indication a first (e.g., 32-bit operands) instruction type.

Accordingly, while the present invention has been disclosed in connection with exemplary embodiments thereof, it should be understood that other embodiments may fall within the spirit and scope of the invention, as defined by the following claims.

The invention claimed is:

1. A processing method, comprising:
   operating a processor in a first mode based on an operand size associated with a first instruction received by the processor; and
   dynamically switching the processor operation mode from the first mode to a second mode based on a different operand size associated with a second instruction received by the processor,
   wherein the dynamic switching comprises switching the processor operation mode without bringing a processor system to a quiescent state.

2. The method of claim 1 wherein operating the processor in the first mode based on the operand size associated with the first instruction received by the processor includes operating the processor in the first mode based on a page attribute indicating the operand size associated with the first instruction.

3. The method of claim 2 wherein operating the processor in the first mode based on the operand size associated with the first instruction received by the processor further includes operating the processor in the first mode based on a cache line attribute indicating the operand size associated with the first instruction.

4. The method of claim 1 wherein dynamically switching the processor operation mode from the first mode to the second mode based on the different operand size associated with the second instruction received by the processor includes dynamically switching the processor operation mode to the second mode based on a page attribute indicating the operand size associated with the second instruction.

5. The method of claim 4 wherein dynamically switching the processor operation mode from the first mode to the second mode based on the different operand size associated with the second instruction received by the processor further includes dynamically switching the processor operation mode to the second mode based on a cache line attribute indicating the operand size associated with the second instruction.

6. The method of claim 1 wherein:
   in the first mode of operation:
      a plurality of registers included in the processor store at least one operand associated with the first instruction; and
      a plurality of execution units included in the processor operate on the stored at least one operand; and
   in the second mode of operation:
      a register included in the processor stores at least one operand associated with the second instruction; and
      at least one execution unit included in the processor operates on the stored at least one operand associated with the second instruction.

7. The method of claim 1 wherein:
   in the first mode of operation:
      a register included in the processor stores at least one operand associated with the first instruction; and
      at least one execution unit included in the processor operates on the stored at least one operand associated with the first instruction; and
   in the second mode of operation:
      a plurality of registers included in the processor store at least one operand associated with the second instruction; and
      a plurality of execution units included in the processor operate on the stored at least one operand associated with the second instruction.

* * * * *